(12) United States Patent
Swix et al.

(10) Patent No.: US 8,812,363 B2
(45) Date of Patent: Aug. 19, 2014

(54) METHODS, SYSTEMS, AND PRODUCTS FOR MANAGING ADVERTISEMENTS

(75) Inventors: Scott R. Swix, Rockford, MI (US); William R. Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 11/821,926

(22) Filed: Jun. 26, 2007

(65) Prior Publication Data

US 2007/0255622 A1    Nov. 1, 2007

Related U.S. Application Data

(62) Division of application No. 10/020,779, filed on Dec. 14, 2001.

(51) Int. Cl.
*G06Q 30/00* (2012.01)

(52) U.S. Cl.
USPC ..................................... 705/14.61; 705/14.68

(58) Field of Classification Search
USPC ..................................... 705/14, 14.61, 14.68
See application file for complete search history.

(56) References Cited

U.S. PATENT DOCUMENTS

| | | |
|---|---|---|
| 677,209 A | 6/1901 | Chernock et al. |
| 3,798,610 A | 3/1974 | Bliss et al. |
| 3,886,302 A | 5/1975 | Kosco |
| 3,924,187 A | 12/1975 | Dormans |
| 4,130,833 A | 12/1978 | Chomet |
| 4,258,386 A | 3/1981 | Cheung |
| 4,361,851 A | 11/1982 | Asip et al. |
| 4,488,179 A | 12/1984 | Kruger et al. |
| 4,566,030 A | 1/1986 | Nickerson et al. |
| 4,567,591 A | 1/1986 | Gray et al. |
| 4,598,288 A | 7/1986 | Yarbrough et al. |
| 4,602,279 A | 7/1986 | Freeman |
| 4,688,248 A | 8/1987 | Tomizawa |
| 4,689,661 A | 8/1987 | Barbieri et al. |
| 4,697,209 A | 9/1987 | Kiewitt et al. |
| 4,698,670 A | 10/1987 | Matty |
| 4,720,873 A | 1/1988 | Goodman et al. |
| 4,816,904 A | 3/1989 | McKenna et al. |

(Continued)

FOREIGN PATENT DOCUMENTS

| | | |
|---|---|---|
| EP | 0 424 648 | 2/1991 |
| EP | 1 162 840 | 12/2001 |

(Continued)

OTHER PUBLICATIONS

Ehrmantraut et al., "The Personal Electronic Program Guide—Towards the Pre-selection of Individual TV Programs", 8 Pages, 1996.

(Continued)

*Primary Examiner* — John Van Bramer
(74) *Attorney, Agent, or Firm* — Scott P. Zimmerman, PLLC

(57) ABSTRACT

Methods, systems, and products are disclosed for managing advertisements. An advertisement time slot is categorized as overrideable or non-overrideable. The overrideable advertisement time slot categorization allows an associated advertisement to be replaced with a different advertisement. The non-overrideable advertisement time slot may not allow replacement of the associated advertisement. When an advertiser requests to replace the advertisement, and when the advertisement time slot is categorized as overrideable, then the advertisement is replaced with the different advertisement.

14 Claims, 3 Drawing Sheets

(56) References Cited

U.S. PATENT DOCUMENTS

| | | |
|---|---|---|
| 4,885,632 A | 12/1989 | Mabey et al. |
| 4,890,322 A | 12/1989 | Russell, Jr. |
| 4,912,552 A | 3/1990 | Allison |
| 5,010,585 A | 4/1991 | Garcia |
| 5,038,211 A | 8/1991 | Hallenbeck |
| 5,046,090 A | 9/1991 | Walker et al. |
| 5,046,092 A | 9/1991 | Walker et al. |
| 5,055,924 A | 10/1991 | Skutta |
| 5,173,900 A | 12/1992 | Miller et al. |
| 5,191,645 A | 3/1993 | Carlucci et al. |
| 5,208,665 A | 5/1993 | McCalley et al. |
| 5,247,347 A | 9/1993 | Litteral et al. |
| 5,249,044 A | 9/1993 | VonKohorn |
| 5,251,324 A | 10/1993 | McMullan, Jr. |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker et al. |
| 5,374,951 A | 12/1994 | Welsh |
| 5,382,970 A | 1/1995 | Kiefl |
| 5,389,964 A | 2/1995 | Oberle |
| 5,404,393 A | 4/1995 | Remillard |
| 5,410,326 A | 4/1995 | Goldstein |
| 5,410,344 A | 4/1995 | Graves et al. |
| 5,436,653 A | 7/1995 | Ellis et al. |
| 5,440,334 A | 8/1995 | Walters et al. |
| 5,444,499 A | 8/1995 | Saitoh |
| 5,446,490 A | 8/1995 | Blahut et al. |
| 5,446,919 A | 8/1995 | Wilkins |
| 5,481,294 A | 1/1996 | Thomas et al. |
| 5,497,185 A | 3/1996 | Dufresne et al. |
| 5,500,681 A | 3/1996 | Jones |
| 5,504,519 A | 4/1996 | Remillard |
| 5,532,732 A | 7/1996 | Yuen et al. |
| 5,532,735 A | 7/1996 | Blahut et al. |
| 5,534,911 A | 7/1996 | Levitan |
| 5,537,143 A | 7/1996 | Steingold et al. |
| 5,559,548 A | 9/1996 | Davis |
| 5,579,124 A | 11/1996 | Aijala et al. |
| 5,585,838 A | 12/1996 | Lawler et al. |
| 5,585,865 A | 12/1996 | Amano |
| 5,589,892 A | 12/1996 | Knee et al. |
| 5,596,994 A | 1/1997 | Bro |
| 5,600,364 A | 2/1997 | Hendricks |
| 5,600,366 A | 2/1997 | Schulman |
| 5,606,359 A | 2/1997 | Youden et al. |
| 5,606,602 A | 2/1997 | Johnson et al. |
| 5,608,448 A | 3/1997 | Smoral et al. |
| 5,619,247 A | 4/1997 | Russo |
| 5,630,119 A | 5/1997 | Aristides |
| 5,649,200 A | 7/1997 | Leblang et al. |
| 5,659,350 A | 8/1997 | Hendricks |
| 5,661,516 A | 8/1997 | Carles |
| 5,710,815 A | 1/1998 | Ming et al. |
| 5,721,827 A | 2/1998 | Logan |
| 5,724,521 A | 3/1998 | Dedrick |
| 5,724,525 A | 3/1998 | Beyers, II et al. |
| 5,724,607 A | 3/1998 | Brandt |
| 5,740,549 A | 4/1998 | Reilly et al. |
| 5,752,159 A | 5/1998 | Faust et al. |
| 5,754,393 A | 5/1998 | Hiratsuka et al. |
| 5,754,775 A | 5/1998 | Adamson et al. |
| 5,754,939 A | 5/1998 | Herz |
| 5,758,257 A | 5/1998 | Herz et al. |
| 5,758,259 A | 5/1998 | Lawler |
| 5,774,170 A * | 6/1998 | Hite et al. ............... 725/34 |
| 5,777,614 A | 7/1998 | Ando et al. |
| 5,778,182 A | 7/1998 | Cathey et al. |
| 5,794,210 A | 8/1998 | Goldhaber et al. |
| 5,796,952 A | 8/1998 | Davis et al. |
| 5,798,785 A | 8/1998 | Hendricks et al. |
| 5,809,481 A | 9/1998 | Baron |
| 5,818,438 A | 10/1998 | Howe |
| 5,838,314 A | 11/1998 | Neel |
| 5,848,396 A | 12/1998 | Gerace |
| 5,848,397 A | 12/1998 | Marsh |
| 5,850,249 A | 12/1998 | Massetti et al. |
| 5,850,447 A | 12/1998 | Peyret |
| 5,854,897 A | 12/1998 | Radziewicz |
| 5,861,906 A | 1/1999 | Dunn et al. |
| 5,867,226 A | 2/1999 | Wehmeyer et al. |
| 5,872,588 A | 2/1999 | Aras et al. |
| 5,872,834 A | 2/1999 | Teitelbaum et al. |
| 5,883,942 A | 3/1999 | Lim et al. |
| 5,892,508 A | 4/1999 | Howe |
| 5,892,536 A | 4/1999 | Logan |
| 5,900,908 A | 5/1999 | Kirkland |
| 5,901,209 A | 5/1999 | Tannhenbaum et al. |
| 5,917,481 A | 6/1999 | Rzeszewski |
| 5,931,908 A | 8/1999 | Gerba et al. |
| 5,945,988 A | 8/1999 | Williams et al. |
| 5,946,636 A | 8/1999 | Uyeno et al. |
| 5,948,061 A | 9/1999 | Merriman et al. |
| 5,973,683 A | 10/1999 | Cragun |
| 5,983,227 A | 11/1999 | Nazem |
| 5,991,735 A | 11/1999 | Gerace |
| 5,991,799 A | 11/1999 | Yen et al. |
| 6,002,393 A | 12/1999 | Hite |
| 6,005,597 A | 12/1999 | Barrett |
| 6,026,368 A | 2/2000 | Brown et al. |
| 6,029,045 A | 2/2000 | Picco et al. |
| 6,029,195 A | 2/2000 | Herz |
| 6,076,094 A | 6/2000 | Cohen |
| 6,081,840 A | 6/2000 | Zhao |
| 6,100,916 A | 8/2000 | August |
| 6,119,098 A | 9/2000 | Guyot et al. |
| 6,128,009 A | 10/2000 | Ohkura et al. |
| 6,134,531 A | 10/2000 | Trewitt et al. |
| 6,134,532 A | 10/2000 | Lazarus |
| 6,160,570 A | 12/2000 | Sitnik |
| 6,163,644 A | 12/2000 | Owashi et al. |
| 6,172,674 B1 | 1/2001 | Ethridge |
| 6,172,677 B1 | 1/2001 | Stautner et al. |
| 6,177,930 B1 | 1/2001 | Chernock et al. |
| 6,177,931 B1 | 1/2001 | Alexander et al. |
| D437,879 S | 2/2001 | Weinandt |
| 6,185,614 B1 | 2/2001 | Cuomo |
| 6,199,076 B1 | 3/2001 | Logan et al. |
| 6,202,210 B1 | 3/2001 | Judtke |
| 6,226,618 B1 | 5/2001 | Downs et al. |
| 6,236,975 B1 | 5/2001 | Boe et al. |
| 6,252,586 B1 | 6/2001 | Freeman et al. |
| 6,253,189 B1 | 6/2001 | Feezell et al. |
| 6,279,157 B1 | 8/2001 | Takasu |
| 6,282,713 B1 | 8/2001 | Kitsukawa |
| 6,286,042 B1 | 9/2001 | Hasselberg et al. |
| 6,292,549 B1 | 9/2001 | Lung et al. |
| 6,304,644 B2 | 10/2001 | Karnowski |
| 6,310,943 B1 | 10/2001 | Kowlaski |
| 6,314,568 B1 | 11/2001 | Ochiai |
| 6,314,577 B1 | 11/2001 | Pocock |
| 6,317,488 B1 | 11/2001 | DePond et al. |
| 6,324,271 B1 | 11/2001 | Sawyer et al. |
| 6,327,574 B1 | 12/2001 | Kramer et al. |
| 6,332,021 B2 | 12/2001 | Latter et al. |
| 6,338,043 B1 | 1/2002 | Miller |
| 6,339,639 B1 | 1/2002 | Henderson |
| 6,341,161 B1 | 1/2002 | Latter et al. |
| 6,345,187 B1 | 2/2002 | Berthoud et al. |
| 6,345,256 B1 | 2/2002 | Milsted et al. |
| 6,351,637 B1 | 2/2002 | Lee |
| 6,353,929 B1 | 3/2002 | Houston |
| 6,366,772 B1 | 4/2002 | Arnson |
| 6,397,057 B1 | 5/2002 | Malackowski et al. |
| 6,400,408 B1 | 6/2002 | Berger |
| 6,408,437 B1 | 6/2002 | Hendricks et al. |
| 6,427,003 B1 | 7/2002 | Corbett |
| 6,434,747 B1 | 8/2002 | Khoo et al. |
| 6,438,216 B1 | 8/2002 | Aktas |
| 6,442,262 B1 | 8/2002 | Moss et al. |
| 6,442,263 B1 | 8/2002 | Beaton et al. |
| 6,445,781 B1 | 9/2002 | Heinmiller et al. |
| 6,446,261 B1 | 9/2002 | Rosser |

(56) References Cited

U.S. PATENT DOCUMENTS

| | | |
|---|---|---|
| 6,457,010 B1 | 9/2002 | Eldering |
| 6,463,468 B1 | 10/2002 | Bush |
| 6,463,585 B1 * | 10/2002 | Hendricks et al. ............... 725/35 |
| 6,477,704 B1 | 11/2002 | Cremia |
| 6,480,589 B1 | 11/2002 | Lee et al. |
| 6,487,538 B1 | 11/2002 | Gupta et al. |
| 6,493,439 B2 | 12/2002 | Lung et al. |
| 6,496,569 B2 | 12/2002 | Pelletier et al. |
| 6,496,571 B1 | 12/2002 | Wilson |
| 6,496,818 B1 | 12/2002 | Ponte |
| 6,498,841 B2 | 12/2002 | Bull et al. |
| 6,505,348 B1 | 1/2003 | Knowles |
| 6,507,839 B1 | 1/2003 | Ponte |
| 6,510,417 B1 | 1/2003 | Woods et al. |
| 6,529,591 B1 | 3/2003 | Dosani et al. |
| 6,530,082 B1 | 3/2003 | DelSesto et al. |
| 6,542,583 B1 | 4/2003 | Taylor |
| 6,542,591 B1 | 4/2003 | Amro et al. |
| 6,546,092 B2 | 4/2003 | Corbett et al. |
| 6,553,110 B1 | 4/2003 | Peng |
| 6,553,178 B2 | 4/2003 | Abecassis |
| 6,560,317 B1 | 5/2003 | Quagliana |
| 6,560,327 B1 | 5/2003 | McConnell |
| 6,570,971 B2 | 5/2003 | Latter et al. |
| 6,571,344 B1 | 5/2003 | Sitnik |
| 6,574,319 B2 | 6/2003 | Latter et al. |
| 6,584,490 B1 | 6/2003 | Schuster et al. |
| 6,631,181 B1 | 10/2003 | Bates et al. |
| 6,631,360 B1 | 10/2003 | Cook |
| 6,639,979 B1 | 10/2003 | Kim |
| 6,647,548 B1 | 11/2003 | Lu et al. |
| 6,650,743 B2 | 11/2003 | Heinmiller et al. |
| 6,675,383 B1 | 1/2004 | Wheeler et al. |
| 6,698,020 B1 | 2/2004 | Zigmond et al. |
| 6,714,992 B1 | 3/2004 | Kanojia et al. |
| 6,718,021 B2 | 4/2004 | Crockett et al. |
| 6,718,551 B1 | 4/2004 | Swix et al. |
| 6,728,355 B2 | 4/2004 | Kowalski |
| 6,731,727 B2 | 5/2004 | Corbett et al. |
| 6,738,978 B1 | 5/2004 | Hendricks et al. |
| 6,748,058 B1 | 6/2004 | Schwend et al. |
| 6,748,068 B1 | 6/2004 | Walsh et al. |
| 6,757,691 B1 | 6/2004 | Welsh et al. |
| 6,766,003 B2 | 7/2004 | Moss et al. |
| 6,766,524 B1 | 7/2004 | Matheny et al. |
| D494,953 S | 8/2004 | Leung |
| 6,771,754 B2 | 8/2004 | Pelletier et al. |
| 6,771,755 B1 | 8/2004 | Simpson |
| 6,772,209 B1 | 8/2004 | Chernock |
| 6,785,301 B1 | 8/2004 | Chapman et al. |
| 6,785,368 B1 | 8/2004 | Eason et al. |
| 6,798,879 B1 | 9/2004 | Beham |
| 6,807,267 B2 | 10/2004 | Moss et al. |
| 6,810,115 B2 | 10/2004 | Fukuda |
| 6,810,527 B1 | 10/2004 | Conrad et al. |
| 6,816,481 B1 | 11/2004 | Adams et al. |
| 6,826,271 B1 | 11/2004 | Kanabar et al. |
| 6,831,974 B1 | 12/2004 | Watson et al. |
| 6,845,151 B2 | 1/2005 | Peng |
| 6,845,396 B1 | 1/2005 | Kanojia et al. |
| 6,845,398 B1 | 1/2005 | Galensky |
| 6,850,988 B1 | 2/2005 | Reed |
| 6,950,804 B2 | 9/2005 | Strietzel |
| 6,970,641 B1 | 11/2005 | Pierre |
| 6,976,268 B2 | 12/2005 | Courtney |
| 6,983,478 B1 | 1/2006 | Grauch et al. |
| 6,985,822 B2 * | 1/2006 | Hoyte ............................... 702/65 |
| 6,985,882 B1 * | 1/2006 | Del Sesto ........................ 705/37 |
| 7,000,245 B1 | 2/2006 | Pierre |
| 7,010,492 B1 | 3/2006 | Bassett et al. |
| 7,020,336 B2 | 3/2006 | Cohen-Solal |
| 7,020,652 B2 | 3/2006 | Matz |
| 7,039,599 B2 | 5/2006 | Merriman |
| 7,039,932 B2 | 5/2006 | Eldering |
| 7,086,075 B2 | 8/2006 | Swix |
| 7,100,183 B2 | 8/2006 | Kunkel et al. |
| 7,212,979 B1 | 5/2007 | Matz et al |
| 7,228,283 B1 | 6/2007 | Hornstein |
| 7,260,823 B2 | 8/2007 | Schlack et al. |
| 7,269,835 B2 | 9/2007 | Swix |
| 7,343,354 B2 | 3/2008 | Hennessey |
| 7,441,260 B1 | 10/2008 | Kurapati |
| 7,444,658 B1 | 10/2008 | Matz |
| 7,587,323 B2 | 9/2009 | Matz |
| 7,587,732 B2 | 9/2009 | Wright et al. |
| 7,593,858 B2 | 9/2009 | Matz |
| 7,617,508 B2 | 11/2009 | Gray |
| 7,661,118 B2 | 2/2010 | Matz |
| 7,979,877 B2 | 7/2011 | Huber et al. |
| 8,086,491 B1 | 12/2011 | Matz |
| 8,196,166 B2 | 6/2012 | Roberts et al. |
| 2001/0004733 A1 | 6/2001 | Eldering |
| 2002/0002488 A1 | 1/2002 | Muyres et al. |
| 2002/0004382 A1 | 1/2002 | Cox et al. |
| 2002/0009184 A1 | 1/2002 | Shnier |
| 2002/0013757 A1 | 1/2002 | Bykowsky |
| 2002/0016748 A1 | 2/2002 | Emodi et al. |
| 2002/0016964 A1 | 2/2002 | Aratani et al. |
| 2002/0032906 A1 | 3/2002 | Grossman |
| 2002/0035600 A1 | 3/2002 | Ullman et al. |
| 2002/0038455 A1 | 3/2002 | Srinivasan et al. |
| 2002/0046099 A1 | 4/2002 | Frengut et al. |
| 2002/0049631 A1 | 4/2002 | Williams |
| 2002/0049967 A1 | 4/2002 | Haseltine et al. |
| 2002/0056109 A1 | 5/2002 | Tomsen |
| 2002/0056118 A1 | 5/2002 | Hunter et al. |
| 2002/0078443 A1 | 6/2002 | Gadkari et al. |
| 2002/0083441 A1 | 6/2002 | Flickinger et al. |
| 2002/0087573 A1 * | 7/2002 | Reuning et al. ............... 707/102 |
| 2002/0090933 A1 | 7/2002 | Rouse et al. |
| 2002/0092017 A1 | 7/2002 | Klosterman et al. |
| 2002/0092019 A1 | 7/2002 | Marcus |
| 2002/0100064 A1 | 7/2002 | Ward et al. |
| 2002/0122401 A1 | 9/2002 | Xiang et al. |
| 2002/0123928 A1 | 9/2002 | Eldering et al. |
| 2002/0133817 A1 | 9/2002 | Markel |
| 2002/0143647 A1 | 10/2002 | Headings |
| 2002/0157108 A1 | 10/2002 | Kitsukawa et al. |
| 2002/0157109 A1 | 10/2002 | Nakano et al. |
| 2002/0169709 A1 | 11/2002 | Kitayama |
| 2002/0183098 A1 | 12/2002 | Lee et al. |
| 2002/0191755 A1 | 12/2002 | Lew et al. |
| 2002/0199197 A1 | 12/2002 | Winter |
| 2003/0003990 A1 | 1/2003 | Von Kohorn |
| 2003/0028432 A1 | 2/2003 | Troyansky et al. |
| 2003/0028873 A1 | 2/2003 | Lemmons |
| 2003/0049967 A1 | 3/2003 | Narumo et al. |
| 2003/0050100 A1 | 3/2003 | Dent |
| 2003/0067554 A1 | 4/2003 | Klarfield et al. |
| 2003/0092384 A1 | 5/2003 | Ross, III |
| 2003/0093792 A1 * | 5/2003 | Labeeb et al. ................... 725/46 |
| 2003/0095650 A1 | 5/2003 | Mize |
| 2003/0108184 A1 | 6/2003 | Brown et al. |
| 2003/0110489 A1 | 6/2003 | Gudorf et al. |
| 2003/0110497 A1 | 6/2003 | Yassin et al. |
| 2003/0115597 A1 | 6/2003 | Yassin et al. |
| 2003/0148758 A1 | 8/2003 | McMullin |
| 2003/0149975 A1 | 8/2003 | Eldering et al. |
| 2003/0172374 A1 | 9/2003 | Vinson |
| 2004/0125929 A1 | 7/2004 | Pope |
| 2004/0128682 A1 | 7/2004 | Liga et al. |
| 2004/0133467 A1 | 7/2004 | Siler |
| 2004/0163101 A1 | 8/2004 | Swix |
| 2004/0193483 A1 | 9/2004 | Wolan |
| 2004/0193488 A1 | 9/2004 | Khoo et al. |
| 2004/0194131 A1 | 9/2004 | Ellis et al. |
| 2004/0215559 A1 | 10/2004 | Rebenack et al. |
| 2004/0220858 A1 | 11/2004 | Maggio |
| 2004/0248560 A1 | 12/2004 | Bedingfield et al. |
| 2004/0261127 A1 | 12/2004 | Freeman et al. |
| 2005/0060759 A1 | 3/2005 | Rowe et al. |
| 2005/0071863 A1 | 3/2005 | Matz |
| 2005/0084084 A1 | 4/2005 | Cook et al. |
| 2005/0132419 A1 | 6/2005 | Gray |

(56) References Cited

U.S. PATENT DOCUMENTS

| | | |
|---|---|---|
| 2005/0137958 A1 | 6/2005 | Huber et al. |
| 2005/0235318 A1 | 10/2005 | Grauch |
| 2005/0239448 A1 | 10/2005 | Bayne |
| 2005/0251820 A1 | 11/2005 | Stefanik |
| 2005/0278741 A1 | 12/2005 | Robarts et al. |
| 2005/0283401 A1 | 12/2005 | Swix |
| 2005/0283792 A1 | 12/2005 | Swix |
| 2006/0031882 A1 | 2/2006 | Swix |
| 2006/0075456 A1 | 4/2006 | Gray |
| 2006/0106710 A1 | 5/2006 | Meek et al. |
| 2006/0161952 A1 | 7/2006 | Herz et al. |
| 2006/0168616 A1 | 7/2006 | Candelore |
| 2006/0253884 A1 | 11/2006 | Gray |
| 2006/0271438 A1 | 11/2006 | Shotland et al. |
| 2006/0271552 A1 | 11/2006 | McChesney et al. |
| 2006/0288367 A1 | 12/2006 | Swix |
| 2007/0038514 A1 | 2/2007 | Patterson et al. |
| 2007/0083885 A1 | 4/2007 | Harding |
| 2007/0226761 A1 | 9/2007 | Zalewski et al. |
| 2007/0250846 A1 | 10/2007 | Swix |
| 2007/0255622 A1 | 11/2007 | Swix |
| 2007/0288350 A1 | 12/2007 | Bykowsky |
| 2008/0004962 A1 | 1/2008 | Muthukrishnan et al. |
| 2008/0104634 A1 | 5/2008 | Gajdos et al. |
| 2008/0147497 A1 | 6/2008 | Tischer |
| 2008/0148311 A1 | 6/2008 | Tischer |
| 2008/0167943 A1 | 7/2008 | O'Neil |
| 2008/0263586 A1 | 10/2008 | Thomas |
| 2009/0292703 A1 | 11/2009 | Matz |
| 2010/0083298 A1 | 4/2010 | Gray et al. |
| 2010/0088725 A1 | 4/2010 | Swix |
| 2010/0100435 A1 | 4/2010 | Matz |
| 2010/0191601 A1 | 7/2010 | Matz |
| 2010/0257037 A1 | 10/2010 | Matz |
| 2011/0178877 A1 | 7/2011 | Swix |

FOREIGN PATENT DOCUMENTS

| | | |
|---|---|---|
| WO | WO 9222983 | 12/1992 |
| WO | WO 94 17609 | 8/1994 |
| WO | WO 96 07270 | 3/1996 |
| WO | WO 9831114 | 7/1998 |
| WO | WO 99 04561 | 1/1999 |
| WO | WO 99/45702 | 10/1999 |
| WO | WO 99 52285 | 10/1999 |
| WO | WO 0147156 | 6/2001 |
| WO | WO 03 052551 | 6/2003 |

OTHER PUBLICATIONS www.actv.com, Screen Print, Oct. 8, 2000.
"ACTV, Inc. Offers Exclusive Preview of 'Individualized Television' at Official All-Star Café," Business Wire, Sep. 16, 1998.
"ACTV's HyperTV & 'Individualized Television' to be Powered by Sun Microsystems' JavaTV Technology," Business Wire, Apr. 21, 1999.
Whitaker, Jerry, "Interactive TV: Killer Ap or Technical Curiosity?", Broadcast Engineering, Dec. 1999.
Dickson, Glen, "Digital TV gets specifically directed," Broadcasting & Cable, Jun. 5, 2000.
Reed, David, "The future is digital," Precision Marketing, v. 13, n.51, p. 27, Sep. 21, 2001.
Wasserman, Todd, "Mining Everyone's Business." Brandweek, Feb. 28, 2000. 19 pages.
Cauley, Leslie, "Microsoft, Baby Bell Form Video Alliance," *The Wall Street Journal*, Sep. 26, 1994.
"allNetDevices:—Report: Interactive TV Soon to Become Direct Marketing Tool," allNetDevices, www.devices.internet.com/com_cgi/print/print.cgi?url=http://devices.../report_interactive.html, (Nov. 16, 2001) pp. 1-2.
"Liberate Technologies—Solutions," Digital Cable Two-Way, www.solutions.liberate.com/architecture/dc2.html, (Nov. 16, 2001) p. 1 of 1.
"Liberate Technologies—Solutions," Digital Broadband Telco, www.solutions.liberate.com/architecture/db.html, (Nov. 16, 2001) p. 1 of 1.
"Liberate Technologies—Solutions," Liberate Connect Suite, www.solutions.liberate.com/products/connect_suite/html, (Nov. 16, 2001) pp. 1-2.
"Liberate Technologies—Solutions," Liberate imprint Server™, www.solutions.liberate.com/products/imprint_server.html, (Nov. 16, 2001) p. 1 of 1.
"Liberate Technologies—Solutions," Liberate Mediacast Server™ www.solutions.liberate.com/products/mediacast_server.html, (Nov. 16, 2001) pp. 1-2.
"Spike High Performance Server Array," Mixed Signals Technologies, Inc., www.mixedsignals.com, itvinfo@mixedsignals.com (2000) p. 1.
"Power, flexibility, and control," RespondTV, www.respondtv.com/whyrespond.html (Nov. 16, 2001) pp. 1-2.
"It just clicks!," RespondTV, www.respondtv.com/inaction.html, (Nov. 16, 2001) pp. 1-2.
"The Wink System," Wink System Diagram, www.wink.com/contents/tech_diagram.html, (Nov. 16, 2001) p. 1 of 1.
"What is Wink?," www.wink.com/contents/whatiswink.html, (Nov. 16, 2001) p. 1 of 1.
"How Wink Works," What is Wink: How wink works, www.wink.com/contents/howitworks.html, (Nov. 16, 2001) p. 1 of 1.
"What is Wink: Examples," What is Wink—Examples, www.wink.com/contents/examples.html, (Nov. 16, 2001) pp. 1-2.
"Nielsen Media Research—Who We Are & What We Do," www.nielsenmedia.com/whoweare.html, (Oct. 11, 2001) pp. 1-4.
Aggarwal et al ("A Framework for the Optimizing of WWW Advertising" Proceedings of the International IFIP/GI Working Conference Trends in Distributed Systems for Electronic Commerce, pp. 1-10, Year of Publication: 1998).
Ehrmantraut et al., "The Personal Electronic Program Guide—Towards the Pre-selection of Individual TV Programs", pp. 1-8, 1996.
U.S. Appl. No. 08/779,306, Grauch.
U.S. Appl. No. 10/017,742, Matz.

* cited by examiner

METHODS, SYSTEMS, AND PRODUCTS FOR MANAGING ADVERTISEMENTS

CROSS-REFERENCE TO RELATED APPLICATIONS

This application is a divisional of U.S. application Ser. No. 10/020,779, filed Dec. 14, 2001 and entitled "Advertising and Content Management Systems and Methods", and incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

FIELD OF THE INVENTION

The present invention relates generally to the field of advertising, and more specifically, to advertising management systems and methods in which a new pricing methodology is employed whereby advertising and content categorized as override may be overridden by an advertiser desiring to pay a premium.

BACKGROUND OF THE INVENTION

Advertisements, also referred to as commercials, are played in between subject portions of a television or radio program, and are the primary source of revenue for television and radio networks. Typically ten to ninety seconds in length, advertisements are grouped together as pre-selected breaks in the broadcast of a program, typically occurring from every few to every fifteen minutes of programming. The number of advertisements and the timing between the placement of the advertisements is dependent on the type of program (e.g., sporting event, sitcom, news program, or movie) and the format of the program (e.g., live or pre-recorded). Television and radio programming, for example, typically include approximately sixteen minutes of advertisements during every hour of programming. Many advertisers use this time as their primary avenue for promoting products, services, and events to consumers.

Advertising rates are generally based on the time slot, popularity of a program, and length of the advertisement. A higher rate is charged for a program with a large audience, due to the theory that more viewers, or listeners, will result in more potential customers receiving the advertisement, which is likely to result in more revenue generated for an advertiser. During the Super Bowl™, for example, a thirty second time spot may cost in the millions of dollars.

Advertisements are not limited to radio and television. In the age of computers, some form of advertisement is displayed on virtually every web-page. Conventional Internet advertising may also be in the form of "pop-up" windows, which are programmed to "pop-up" in their own separate window when a certain web-site is triggered, or opened. Many Internet service providers and search-engine companies are able to offer free services to consumers because of the large amounts of advertising dollars that they receive from advertisers. Like television and radio, the more popular a particular web-site is, the more that it is accessed by consumers, and the more the owner may charge for advertising space.

Advertising is generally more effective when products and services reach consumers that have an interest in the particular product or service. This is referred to as "targeted advertising," in which an advertiser identifies a group of people as being those that are likely to purchase what is being advertised, and providing the most favorable situation in which the advertisement will reach that pre-determined group of consumers. As an example, it is generally known that a lot of men like sports. It is also generally known that a lot of men drink beer. Therefore, it makes economic sense for an advertiser to run a beer advertisement during sporting events, when it is more likely that men will be watching television. As stated above, advertisement time during the Super Bowl™ is very expensive, and although very expensive, it is common to see a large number of beer commercials during the Super Bowl™. This is normally because advertisers feel that the large premiums paid for time slots during the game will be made-up for by the amount of revenue that the commercial will generate for the company through beer sales.

In determining whether a program, or web-page, may be appropriate for a particular advertisement, advertisers typically consider whether the program attracts large numbers of viewers who are of the same age group, gender, income bracket, and who have similar interests and hobbies with those who are most likely to purchase the product being advertised. Selecting an advertisement and advertising slot in this manner, increases the likelihood that viewers who watch the advertisement will be interested viewers.

Broadcasting networks and advertisers are able to gauge which demographic groups are watching which programs using conventional market research tools. For example, the AC Nielsen™ ratings system tracks television viewing activities by sampling a plurality of households, and estimating the number of viewers of particular programs using the viewing activity data. Advertisers also use market research companies which conduct focus groups that study the effectiveness of different types of television advertisements. These market research tools assist advertisers in creating advertisements, and selecting appropriate time slots in which to run them. To help ensure that viewers watch a particular advertisement, advertisers use techniques that help to grab a viewers attention, such as visual stimulus, catchy slogans, and jingles.

To gauge the effectiveness of their spending, advertisers have long sought information related to potential consumer viewing patterns. There are several conventional devices and techniques that exist for gathering such information. For example, U.S. Pat. No. 4,258,386 issued to Cheung discloses "an apparatus for television audience analysis comprising means for monitoring a television receiver, means responsive to a monitored signal for storing information representative of channel identification and of the time at which a channel is selected and at which the selection of a channel is terminated, and means for reading the stored information periodically."

As another example, U.S. Pat. No. 4,556,030 issued to Nickerson, et al., discloses "a data storage and transmission system for accumulating and transmitting data from a plurality of remote T.V. panelist locations to a central location. Each remote unit includes a microprocessor, a control memory, and a data store memory. The control memory stores control information for the remote unit, which may include dynamic allocation information. The data store memory is event driven and stores data as to television channel selection and times thereof, and can store viewer reaction data and the like. At a pre-selected time, each remote unit initiates a telephone call to a central location and identifies itself. Upon successful telephone connection between a remote unit and the central location, any data such as viewer habit and/or reaction data and the like contained in the data store memory is transmitted over the telephone line to the central location."

Other conventional systems and methods provide somewhat more use data than only channel numbers viewed and the time of viewing, such as which products panelists purchase. U.S. Pat. No. 4,816,904 issued to McKenna, et al., discloses "a data gathering system including a plurality of remote units which are controlled from a central location. Each of the remote units are attached to a television receiver which is generally, but not necessarily, attached to a cable system. Each of the remote units may function to determine which of several TV modes is in use as well as to store TV channel selector data, data from an optical input device, and/ or data input by viewers representative of the composition of the viewing audience. The data is stored for either later collection by a portable data collector, or for direct transmission via telephone to the central location. A video message for a TV viewer, such as a survey, may be transmitted from the central location and stored at the remote units, for later display on the TV receiver associated with the remote units. The substitution of alternate programming information may also be achieved by the central control point on selected of the remote units."

Conventionally, panelist monitoring may be used to gauge the effectiveness of advertising on a selected group of panelists. Nevertheless, while panelist monitoring systems like those described above provide somewhat more monitoring data than just TV tuning data, they do so only for limited groups. For example, when more data is gathered (like purchase information), it is done only for the panelist groups, rather than for subscribers of the entire system.

Conventional systems typically capture ratings information that identifies which television shows are viewed, rather than whether the subscriber also viewed the commercials displayed during those shows. What is important to an advertiser is that potential consumers are interested in an advertisement enough to sit through its duration. There is a great deal of money invested in advertising, with the hopes that it will return even greater profits.

Conventional advertising management systems comprise what is generally referred to as a "locked" advertisement delivery system. In this conventional system, time slots are pre-purchased by advertisers. The rates for these time slots are based upon the demand for the particular time slot, as described above. When time slots are purchased, they are grouped together and run as a commercial break during a program, also as described above. When a time slot is purchased, it is no longer available to a second advertiser that may be interested in purchasing the same time slot, but who did not purchase it first. Conventional advertising management systems are basically first-come-first-serve. There may be bidding for a particular slot, but once a rate is agreed to by the advertising slot provider, that time slot is set.

Conventional advertising methods include several drawbacks, such as excluding potential consumers, and including viewers that have no desire to purchase the product or service. Advertisers must continuously evaluate advertising mediums and time slots. When selecting time slots, advertisers take into account which times of the day they are most likely to find large volumes of viewers, whether or not those viewers are of a desired demographic, and which programs are most appropriate to place advertisements into.

What is needed are novel systems and methods that result in more effectively spent advertising dollars for advertisers, which results in increased profit margins for the advertisers and also for network media providers. What is needed are novel systems and methods which result in flexibility and options for advertisers in selecting advertising time slots.

BRIEF SUMMARY OF THE INVENTION

In a preferred embodiment, the present invention provides a pricing methodology whereby scheduled advertising content broadcast to potential consumers may be overridden and replaced by advertising content from an advertiser paying a premium. The method includes a first advertiser occupying an advertisement time slot with a first advertisement, categorizing the first advertisement as an overrideable advertisement or a non-overrideable advertisement, receiving a request from a second advertiser to replace the first advertisement with a second advertisement, and if it is determined that the first advertisement is categorized as an appropriate override advertisement, replacing the first advertisement with the second advertisement. The second advertisement is then broadcast to consumers in place of the first advertisement. Advertisements are broadcast to potential consumers via a broadcast transmission, wherein the broadcast transmission may include a television broadcast, a radio broadcast, and a broadcast sent over the Internet and received on a personal computer.

Various pricing structures may be employed. In one embodiment, the method further involves pricing an overrideable advertisement at a lower price than a non-overrideable advertisement, and wherein a premium is paid to replace the first advertisement with the second advertisement.

A request to replace the first advertisement with the second advertisement may be based upon data obtained using marketing tools and programming ratings collection and analysis systems to identify most-valuable and least-valuable viewers. The ratings collection and analysis systems may track program viewing activities by sampling a plurality of households and estimating the number of viewers of the programs using viewing activity data, focus groups that study the effectiveness of different types advertisements, and product sales reports.

In an alternative embodiment, the advertisement management method further includes receiving requests, and processing, storing, managing, and inserting advertisements using an interactive server. The interactive server compares the second and/or first advertisement with a plurality of pre-determined criteria, and if the advertisement meets a pre-selected number of the plurality of criteria, the interactive server may replace the first advertisement with the second advertisement.

In a further embodiment, the present invention provides a system for managing advertisement programming including a first advertisement provided by a first advertiser, a second advertisement provided by a second advertiser, and an interactive server of a network content provider, wherein the interactive server is operable for replacing the first advertisement with the second advertisement if a plurality of pre-determined criteria are met.

Embodiments of the present invention provide various advantages, such as novel advertisement pricing methodologies, advertisement time slot purchasing options, and targeted advertising methodologies. Embodiments of the present invention provide methods of effective advertising management and targeting that ensure that a particular demographic group receives the most appropriate materials.

Additional objects, advantages, and novel features of the invention will be set forth in part in the description which follows, and in part will become more apparent to those skilled in the art upon examination of the following, or may be learned by practice of the invention.

DETAILED DESCRIPTION OF THE INVENTION

As required, detailed embodiments of the present invention are disclosed herein, however, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Conventional hardware and systems are shown in block diagram form and process steps are shown in flowcharts.

Figure 1:
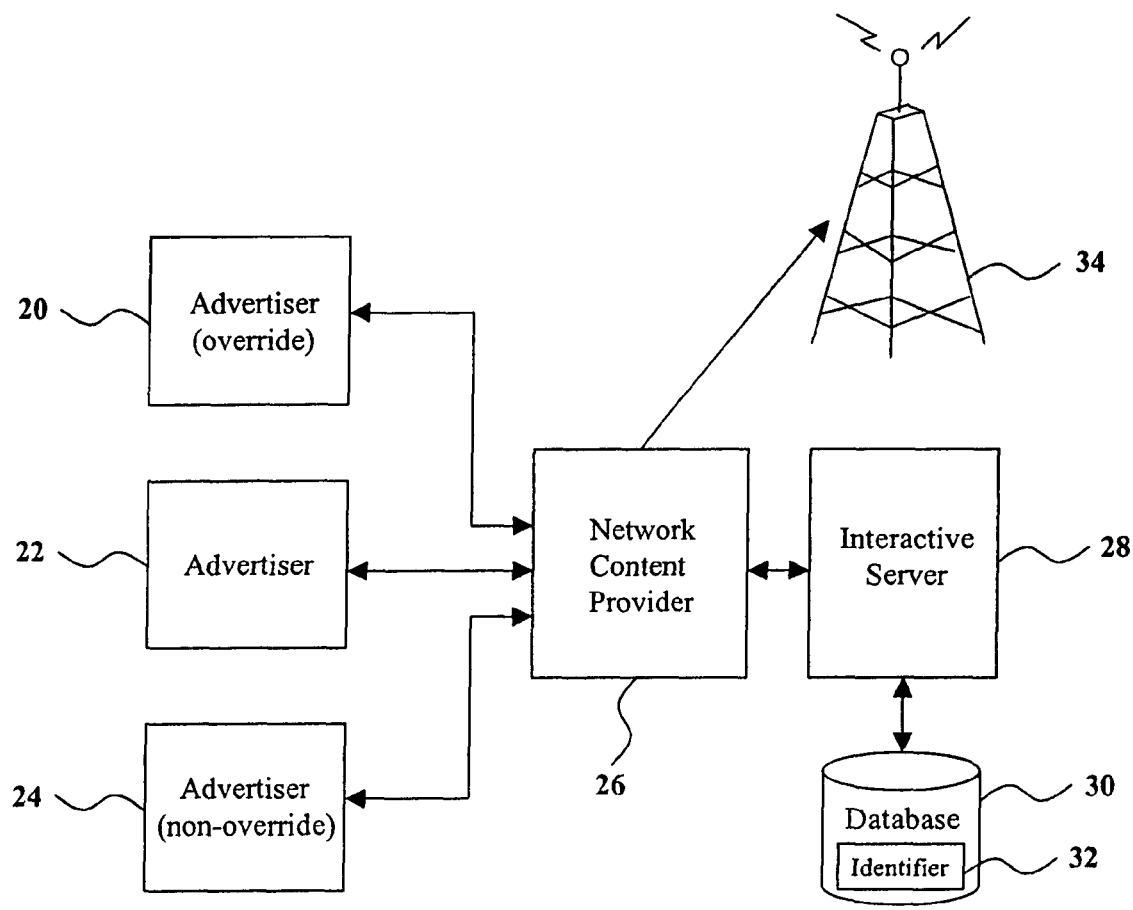
FIG. 1 is a exemplary hardware environment of the present invention in which a network provider responds to a request from an advertiser using data obtained from an interactive server.

Referring now to the drawings, in which like numerals indicate like elements throughout the several figures, FIG. 1 illustrates an exemplary hardware environment in which programming content delivered in a scheduled lineup may be overridden by an advertiser desiring to pay a premium. FIG. 1 illustrates various system elements and subsystems that communicate with each other to transmit collected data information and data acknowledgments. The term scheduled is used herein to include the delivery of advertising and content whereby a fixed array of content programming is provided, and payments are made by advertising and content providers based upon that fixed array.

In one embodiment, a first advertiser 20 has a first advertisement already inserted into a scheduled broadcast to be transmitted in the future. The first advertisement has been categorized as an override advertisement, as discussed above. A second advertiser 22 has a second advertisement that is not yet inserted into any broadcast transmission, but desires to insert the second advertisement into the same broadcast transmission as the first advertiser 20. A third advertiser 24 has a third advertisement already inserted into the same broadcast transmission as the first advertiser 20. The third advertisement has been categorized as a non-override advertisement, as will be discussed below. All three advertisers 20, 22, 24 are in communication with a network content provider 26 that controls the broadcast and manages the advertisements.

The network content provider 26, responsible for providing a network service in which advertisements are broadcast to potential consumers, operates and maintains a system equipped to receive signals and other content from the advertisers 20, 22, 24. The network content provider 26 may be any original or secondary source of network programming including, for example, television, radio, Internet, or like digital environment. Content providers 26 may broadcast directly to potential consumers, or alternatively, may broadcast to a provider that receives and retransmits a broadcast to potential consumers. The advertisers 20, 22, 24 furnish content originated by them to the network content provider 26 that incorporates that content into the network content provider's 26 broadcast.

The system of FIG. 1 comprises an interactive server 28 operable for advertisement management. As is shown, the network content provider 26 and the advertisers 20, 22, 24 are connected to the interactive server 28 via the network content provider 26. The interactive server is capable of managing advertisements, receiving requests, checking a plurality of pre-determined criteria, and responding to the requests from the advertisers 20, 22, 24.

Signals containing requests and programming content furnished by the advertisers 20, 22, 24 are sent via suitable communication paths to content provider 26 and ultimately to the interactive server 28 comprising a processor for processing information. A provisioning technique available to an advertiser 22 with Internet access includes a Web-based form of entry of advertisement information. Using such a technique, an advertiser 22 using a browser running on a computer with an Internet connection accesses the interactive server and inputs requests and receives responses. Requests may include specific information relating to a particular advertisement or time slot, such as override and non-override categorization, and the override option. Advertisement schedules, characteristics, identifiers, and pricing may be stored in a database 30 of the interactive server 28. Each individual advertisement may have an associated identifier 32 that is used to identify the specific advertisement. The identifier 32 may include descriptive information such as the time length of the advertisement and file size. When a signal is received by the interactive server 28, the interactive server 28 identifies the selected advertisement and may insert it into a program time slot using if a series of checkpoints are completed and approved, as discussed above.

The network content provider 26 is able to insert the advertisement, identified by the interactive server 28 using its identifier, into the broadcast transmission 34. The primary functionality of the network content provider 26 is provided by the interactive server 28, which stores and manages the advertisements provided by the advertisers, and which responds to requests from the advertisers.

In one embodiment of the present invention, a provisioning method is provided in which an advertiser may access the interactive server 28 and override a prescheduled advertisement based on monitoring and marketing tools. The monitoring and marketing tools provide data to an advertiser which aid in selecting the most desirable time slot for each particular advertisement based on the data. Using data gathered regarding viewing habits, such as set top boxes use for monitoring viewing habits and collecting information, to distinguish more-valuable from less-valuable viewers, along with override and non-override categories, content and advertisements may be matched with more-valuable and less-valuable viewer subsets.

Figure 2:
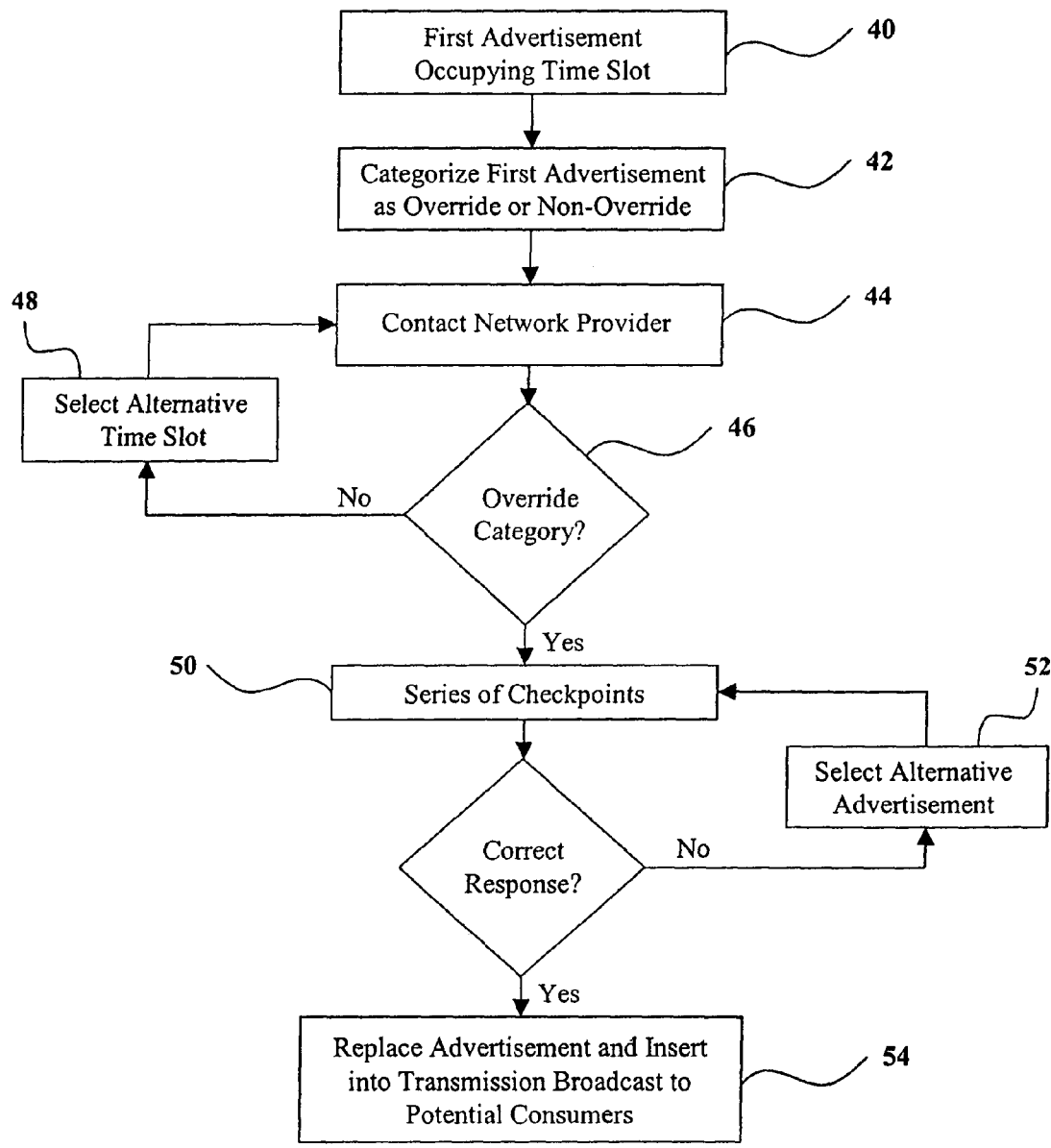
FIG. 2 is a functional block diagram illustrating one embodiment of the present invention in which an advertiser desiring to replace a scheduled advertisement contacts a network provider.

FIG. 2 illustrates a preferred embodiment of an advertising management method in which an advertiser, by paying a premium, may replace a scheduled advertisement with a different advertisement. The method includes a first advertiser having a first advertisement that is scheduled to be broadcast at some time in the future (Block 40). The first advertisement may be part of a group of advertisements which are shown at pre-determined times during a subject program. Typically, one hour of programming usually includes about sixteen minutes of advertising. Each advertisement corresponds with a time slot, and time slots are grouped together to form a commercial break in the programming schedule.

The present invention establishes a pricing methodology whereby an advertisement categorized as override may be overridden, or replaced. When providing an advertisement to a network provider for broadcast, an advertiser has the option of categorizing the advertisement as either an override or a non-override advertisement (Block 42), and paying a corresponding fee based on the category chosen. In an alternative embodiment, a network provider may offer time slots that are pre-categorized as either override or non-override, and an advertiser may purchase a time slot based upon the desired category. Overrideable is hereby defined as capable of being replaced. Non-override is hereby defined as not capable of being replaced. An overrideable advertisement is an advertisement that may be broadcast, or, may be replaced by a different advertisement, either from the same or a different advertiser. A non-overrideable advertisement is an advertisement that will be broadcast, and is not capable of being replaced.

In the preferred embodiment, an advertisement, or time slot, categorized as override is priced at a lower cost than an advertisement, or time slot, categorized as non-override, for the reason that an override advertisement may not be broadcast if replaced. An advertiser may opt to purchase this advertising option due to its lower price. An advertiser may also opt to purchase the option based upon information that may lead the advertiser to believe that their advertisement will most likely not be overridden. The information may include such items as the time of day, the day of the week, the program that the advertisement will be shown during, time slot demand, marketing tools, and previous advertiser replacements. For example, if an advertiser has a limited advertising budget, the advertiser may opt to categorize his/her advertisement as an override advertisement based upon time slot demand and the past history of replacements made during the desired time slot. In another example, if an advertiser has a very limited potential consumer audience that also coincides with a low-demand time slot, the advertiser may choose the lower priced overrideable option to save money.

In the preferred embodiment, an advertisement, or time slot, categorized as non-override is priced at a higher cost than an advertisement, or time slot, categorized as override, for the reason that a non-override advertisement will be broadcast and can not be replaced. An advertiser may opt to purchase this advertising option due to demand and projected audience value. An advertiser may also opt to purchase the option based upon information that may lead the advertiser to believe that the greater cost will lead to greater revenues. The information may include such items as the time of day, the day of the week, the program that the advertisement will be shown during, time slot demand, marketing tools, and previous advertiser replacements.

In the preferred embodiment, an advertiser wishing to override the first advertisement with the second advertisement may be required to pay a premium. The amount of the premium may vary based upon the time slot desired and the characteristics and content of the subject matter surrounding the commercial break. For example, desired override advertising time during a live one-time championship sporting event may be priced at a much higher amount than override advertising time during a regularly scheduled program due to the special nature of the program.

Network providers, such as television and radio, sell advertising space based on the length of time of an advertisement, the day of the week, the time of day, advertiser demand, and the type of program the advertisement will be played during. Most television viewers watch television during the prime-time viewing hours of about 7 pm to about 10 pm, and network providers, therefore, charge higher rates during these viewing hours due to advertiser demand. Internet network providers may sell advertising time based on file size and type, and may also set fees based on the time of day, the day of the week, and specific programs.

Content delivered to a network content provider by an advertiser includes advertisements relating to products, services, and events. The advertisements, in one example referred to as commercials, are played in between the subject potions of the network content providers program. Referring to television and radio broadcasts, advertisements range from about ten to about ninety seconds in length, and are grouped together as pre-selected breaks in the broadcast of the program, occurring every few minutes of programming. The number of advertisements and the timing between the placement of the advertisements is dependent upon the type of program (e.g., sporting event, sitcom, news program, or movie) and the format of the program (e.g., live or pre-recorded). Television and radio programming, for example, typically include approximately sixteen minutes of advertisements during every hour of programming.

The method further includes a second advertiser, having a second advertisement, desiring the time slot occupied by the already scheduled first advertisement. The second advertiser then contacts the appropriate network provider that is in charge of the scheduling of the desired time slot, to inquire about overriding the first advertisement and replacing it with the second advertisement (Block 44). As stated above, only an advertisement categorized as override is capable of being overridden. The network provider then informs the second advertiser of the category of the first advertisement or time slot (Block 46).

The network content provider (26, FIG. 1) checks the first advertisements category and may determine that the first advertisement is an override advertisement, in which case the second advertiser has the option of overriding, or replacing the first advertisement with a second different advertisement. The network content provider 26 may determine that the first advertisement is a non-override advertisement, in which case the second advertiser is not able to replace the first advertisement and must either choose a new first advertisement or time slot (Block 48), or opt not to proceed.

After the network content provider (26, FIG. 1) determines that the first advertisement is capable of being overridden, the network provider 26 goes through a series of checkpoints (Block 50) to determine if the second advertisement may be inserted into the broadcast in the place of the first advertisement. A correct response to the series of checkpoints will lead to the replacement of the first advertisement with the second advertisement (Block 54). An incorrect response to the series of checkpoints leads to the advertiser having to choose an alternative second advertisement to be inserted (Block 52), or opting not to proceed.

The series of checkpoints may include the first and second advertisements lengths in time, the proper fees, technical specifications, and a search to determine when the last time that an advertisement was broadcast relating to the same or similar type product. The time length requirement is to ensure that the second advertisement is an appropriate fit and will not result in a disruption in the broadcast transmission. The proper fees checkpoint is to ensure that a premium has been paid, or will be paid, by the advertiser to override the first advertisement. Technical specifications may include such items as formatting and an appropriate amount of time necessary to implement the change without a causing a disruption in the broadcast transmission. Other technical specifications will be well-known to those of ordinary skill in the art.

To illustrate the series of checkpoints, for example, assume that an advertiser of a sport-utility automobile desires to replace a first sport-utility automobile advertisement, of a competitor, with a second advertisement. The advertisement substitution may involve the network content provider (26, FIG. 1) and ultimately the interactive server (28, FIG. 1) running through a series of checkpoints to determine if a substitution is possible and appropriate. The series may involve verifying that the first advertisement is indeed an advertisement categorized as overrideable. Once verified, the network provider 26 may then determine whether the second advertisement possesses the required characteristics in order to replace the first advertisement, such as equal or near in length time lengths and whether the second advertisement has been recorded in a compatible format with the scheduled broadcast. A further checkpoint may include a search by the network provider 26 or interactive server 28 to determine when the last time an advertisement was broadcast relating to a sport-utility vehicle, or any vehicle, either by the same or different advertiser. The network provider 26 may opt not to replace the first advertisement if the second advertiser had a similar advertisement run in the recent past, such as a term of a few hours.

Figure 3:
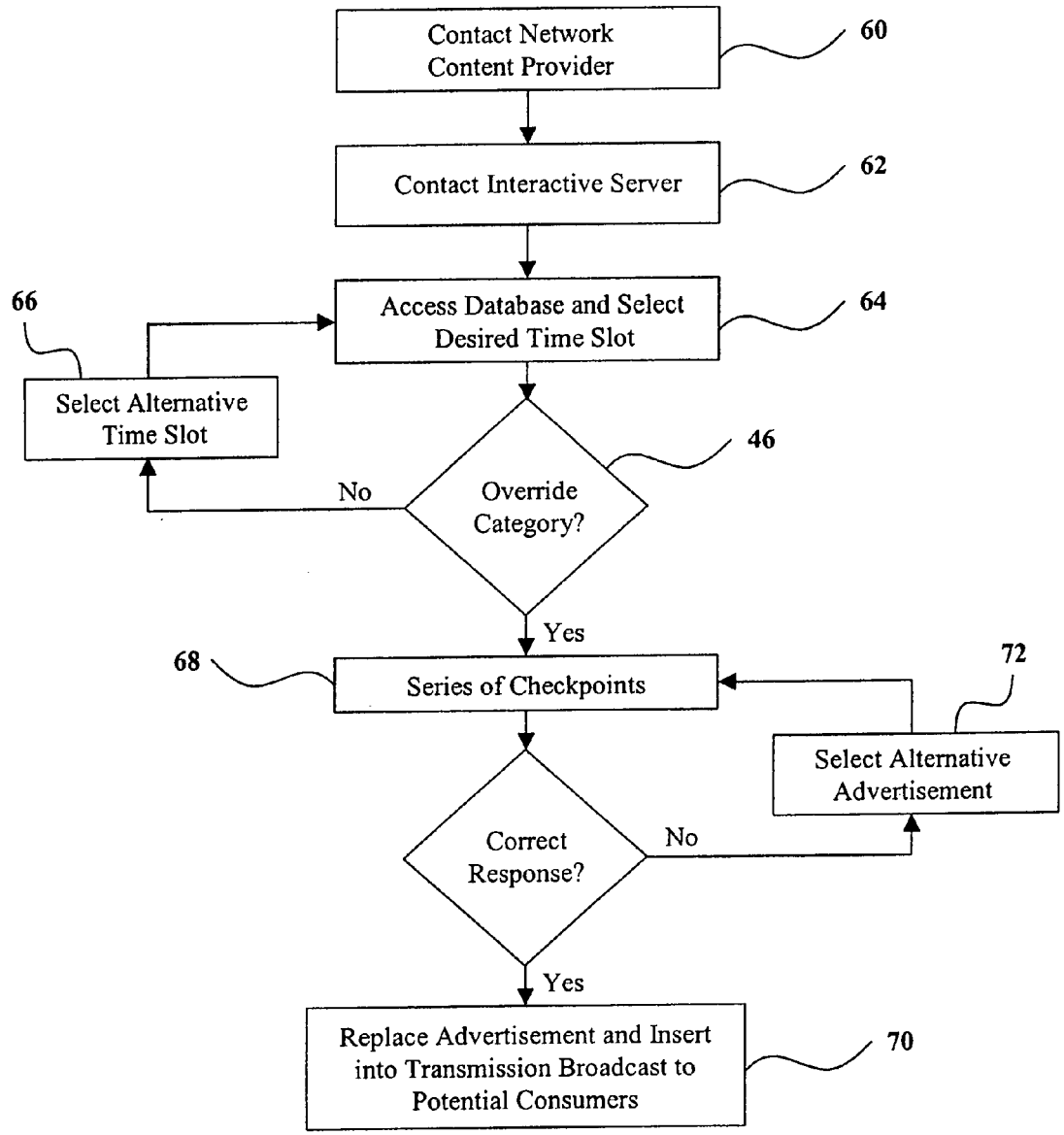
FIG. 3 is a functional block diagram illustrating one embodiment of the present invention in which an advertiser desiring to replace a scheduled advertisement contacts a network provider and ultimately an interactive server.

Referring to FIG. 3, in an alternative embodiment, the pricing methodology discussed above may include the interactive server (28, FIG. 1) operable for advertisement management. The method includes a first advertiser having a first advertisement already inserted into a scheduled broadcast that will be transmitted in the future (Block 40, FIG. 2). The second advertiser having a second advertisement desires the specific time slot occupied by the first advertisement. The second advertiser first contacts the network content provider (Block 60) and ultimately the interactive server 28 of the network content provider (Block 62).

The interactive server 28 receives a request from the second advertiser 22 regarding specifications and override options relating to the first advertisement. The interactive server 28 accesses and retrieves information from the database (Block 64). As stated above, only an advertisement categorized as override is capable of being overridden. The interactive server 28 transmits the requested information to the second advertiser regarding the first advertisement, information including categorization.

The network content provider (26, FIG. 1) checks the first advertisements category (Block 46, FIG. 2) and may determine that the first advertisement is an override advertisement, in which case the second advertiser has the option of overriding, or replacing the first advertisement with a second different advertisement. The network content provider 26 may determine that the first advertisement is a non-override advertisement, in which case the second advertiser is not able to replace the first advertisement and must either choose a new first advertisement or time slot (Block 66), or opt not to proceed.

After the interactive server 28 determines that the first advertisement is capable of being overridden, the interactive server 28 runs through a series of checkpoints (Block 68) to determine if the second advertisement may be inserted into the broadcast in the place of the first advertisement. A correct response to the series of checkpoints will lead to the replacement of the first advertisement with the second advertisement (Block 70). An incorrect response to the series of checkpoints leads to the advertiser having to choose an alternative second advertisement to be inserted (Block 72), or opting not to proceed.

As stated above, the series of checkpoints may include the first and second advertisements lengths in time, the proper fees, technical specifications, and a search to determine when the last time that an advertisement was broadcast relating to the same or similar type product. The time length requirement is to ensure that the second advertisement is an appropriate fit and will not result in a disruption in the broadcast transmission. The proper fees checkpoint is to ensure that a premium has been paid, or will be paid, by the advertiser to override the first advertisement. Technical specifications may include such items as formatting and an appropriate amount of time necessary to implement the change without a causing a disruption in the broadcast transmission. Other technical specifications will be well-known to those of ordinary skill in the art.

In one embodiment, the present invention may acquire data used to select a desired advertising time slot based on a demographics and programming ratings collection and analysis system, as is well known in the art. The ratings collection and analysis systems may track program viewing activities by sampling a plurality of households and estimating the number of viewers of the programs using viewing activity data, focus groups that study the effectiveness of different types advertisements, and product sales reports. Using data gathering technology to identify valuable viewers, override and non-override advertisements may be matched to correspond with most-valuable and least-valuable viewer subsets. In one embodiment, a processor determines valuable viewer subsets by collecting information to create a log about all events or selected events of interest viewed by potential consumers. Other marketing tools may be used to determine valuable viewer subsets, and the information obtained using these marketing tools may aid an advertiser in making decisions regarding when to override a scheduled advertisement.

The systems and methods of the present invention may be employed for use Internet advertising management. In one embodiment, an Internet network content provider may provide advertisements displayed as "pop-up" web-pages. A scheduled programmed first "pop-up" advertisement may be replaced by a second advertisement in a similar manner as described above. Alternative embodiments may include replaceable advertisements displayed on a web-page containing additional content unrelated to the product or service being displayed.

The systems and methods of the present invention may be employed for use in radio broadcasts. A scheduled first advertisement may be replaced by a second advertisement in a commercial break broadcast during a radio program, using the pricing methodology described above. In alternative embodiments, the systems and methods of the present invention may be employed in any additional field in which advertisements are broadcast to viewers.

The foregoing is provided to explain and disclose preferred embodiments of the present invention, modifications to which may be made that still fall within the following claims. For instance, the architecture and programming of the system may be modified. Or, a variety of different manufacturers' servers or databases may be configured in order to implement the system. Further modifications and adaptations to the described embodiments will be apparent to those skilled in the art and may be made without departing from the scope or spirit of the invention and the following claims.

What is claimed is:

1. A method, comprising:
    categorizing, by a server, an advertisement time slot as one of overrideable and non-overrideable, an overrideable advertisement time slot allowing an advertisement of an advertiser to be replaced with a different advertisement of the advertiser, and a non-overrideable advertisement time slot not allowing replacement of the advertisement;
storing a webpage in memory of the server;
receiving the advertisement from the advertiser and storing the advertisement in the memory of the server;
receiving, from the advertiser at the webpage of the server, a request for a future advertisement time slot in a scheduled lineup;
providing advertising information to the advertiser in response to the request, the advertising information describing the advertisement scheduled in the future advertisement time slot;
receiving, from the advertiser accessing the webpage of the server, a request to replace the advertisement with the different advertisement;
determining the advertisement time slot is categorized as overrideable by the advertiser, such that the advertisement time slot is associated with advertisements of the advertiser;
determining the advertisement and the different advertisement are equal in time length;
determining the different advertisement has been recorded in a compatible format with the scheduled lineup;
searching to determine a time of broadcast of a previous advertisement relating to the different advertisement;
determining the previous advertisement was broadcast outside a predetermined timeframe;
overriding, by the server, the scheduled lineup having the advertisement scheduled in the future advertisement time slot;
replacing, by the server, the advertisement in the scheduled lineup with the different advertisement of the advertiser; and
broadcasting an overridden lineup from the server, the overridden lineup having the advertisement replaced by the different advertisement.

2. The method of claim 1, further comprising receiving a financial premium from the advertiser to replace the advertisement.

3. The method of claim 1, further comprising pricing the overrideable advertisement time slot at a lower cost than a non-overrideable advertisement time slot.

4. The method of claim 1, further comprising providing data regarding viewing habits that distinguish more-valuable viewers from less-valuable viewers.

5. The method of claim 4, further comprising matching the advertisements with the more-valuable viewers and with the less-valuable viewers.

6. The method of claim 1, further comprising creating a log of events viewed by potential consumers.

7. A system, comprising:
a processor; and
a memory storing a program that when executed causes the processor to perform operations, the operations comprising:
categorizing an advertisement time slot as one of overrideable and non-overrideable, an overrideable advertisement time slot allowing an advertisement of an advertiser to be replaced with a different advertisement of the advertiser, and a non-overrideable advertisement time slot not allowing replacement of the advertisement;
storing a webpage in the memory;
receiving different advertisements from the advertiser and storing the advertisements in the memory;
receiving, from the advertiser at the webpage, a request for a future advertisement time slot in a scheduled lineup;
providing advertising information to the advertiser in response to the request, the advertising information describing the advertisement scheduled in the future advertisement time slot;
receiving, from the advertiser accessing the webpage, a request to replace the advertisement with the different advertisement;
determining the advertisement time slot is categorized as overrideable to the advertiser, such that the advertisement time slot is associated with advertisements of the advertiser;
determining the advertisement and the different advertisement are equal in time length;
determining the different advertisement has been recorded in a compatible format with the scheduled lineup;
searching to determine a time of broadcast of a previous advertisement relating to the different advertisement;
determining the previous advertisement was broadcast outside a predetermined timeframe;
overriding the scheduled lineup having the advertisement scheduled in the future advertisement time slot;
replacing the advertisement in the scheduled lineup with the different advertisement; and
broadcasting an overridden lineup, the overridden lineup having the advertisement replaced by the different advertisement.

8. The system of claim 7, wherein the operations further comprise receiving a financial premium from the advertiser to replace the advertisement.

9. The system of claim 7, wherein the operations further comprise pricing the overrideable advertisement time slot at a lower cost.

10. The system of claim 7, wherein the operations further comprise providing viewing habits that distinguish more-valuable viewers from less-valuable viewers.

11. The system of claim 10, wherein the operations further comprise matching the advertisements with more-valuable viewers and with less-valuable viewers.

12. A server storing processor-executable code for performing a method of managing advertisements, the method comprising:
categorizing, by the server, an advertisement time slot as one of overrideable and non-overrideable, an overrideable advertisement time slot allowing an advertisement of an advertiser to be replaced with a different advertisement of the advertiser, and a non-overrideable advertisement time slot not allowing replacement of the advertisement;
storing a webpage in memory of the server;
receiving the advertisement from the advertiser and storing the advertisements in the memory of the server;
receiving, from the advertiser at the webpage of the server, a request for a future advertisement time slot in a scheduled lineup;
providing advertising information to the advertiser in response to the request, the advertising information describing the advertisement scheduled in the future advertisement time slot;
receiving, from the advertiser accessing the webpage of the server, a request to replace the advertisement with the different advertisement;
determining the advertisement time slot is categorized as overrideable to the advertiser, such that the advertisement time slot is associated with advertisements of the advertiser;

overriding, by the server, the scheduled lineup having the advertisement scheduled in the future advertisement time slot;

replacing, by the server, the advertisement in the scheduled lineup with the different advertisement; and broadcasting an overridden lineup from the server, the overridden lineup having the advertisement replaced by the different advertisement.

13. The server of claim 12, further comprising code for providing data regarding viewing habits that distinguish more-valuable viewers from less-valuable viewers.

14. The server of claim 13, further comprising code for matching the advertisements with the more-valuable viewers and with the less-valuable viewers.

\* \* \* \* \*